Sept. 14, 1954    M. R. PESCE    2,689,199
NONWOVEN FABRICS
Filed June 27, 1950    3 Sheets-Sheet 1

INVENTOR
Mario R. Pesce
BY Philip E. Siggers
ATTORNEY

Sept. 14, 1954  M. R. PESCE  2,689,199
NONWOVEN FABRICS
Filed June 27, 1950  3 Sheets-Sheet 2
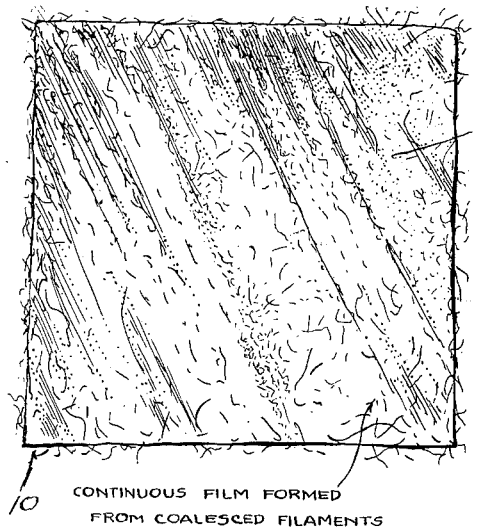
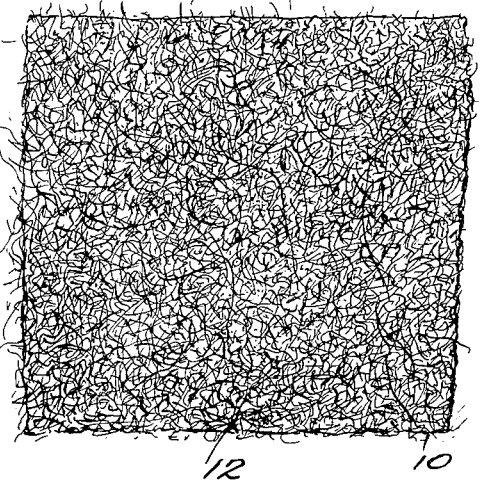
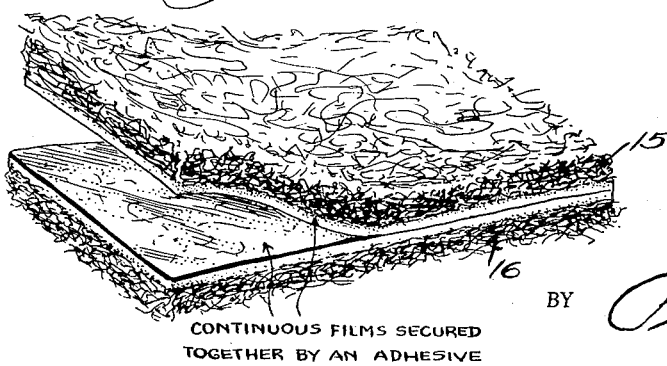
INVENTOR
Mario R. Pesce
BY Philip E. Siggers
ATTORNEY Sept. 14, 1954  M. R. PESCE  2,689,199
NONWOVEN FABRICS
Filed June 27, 1950  3 Sheets-Sheet 3
Fig. 6
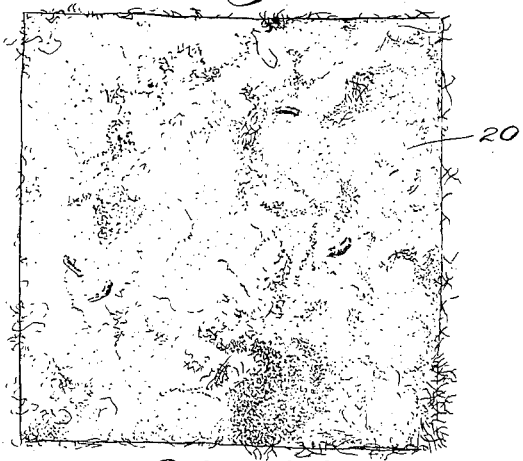
Fig. 7
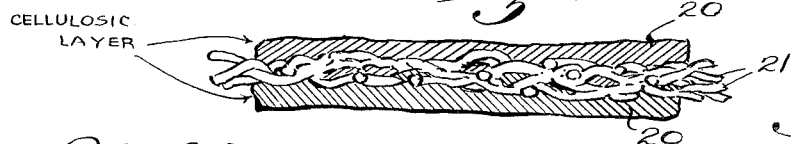
Fig. 9
Fig. 8
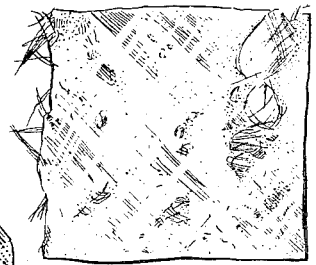
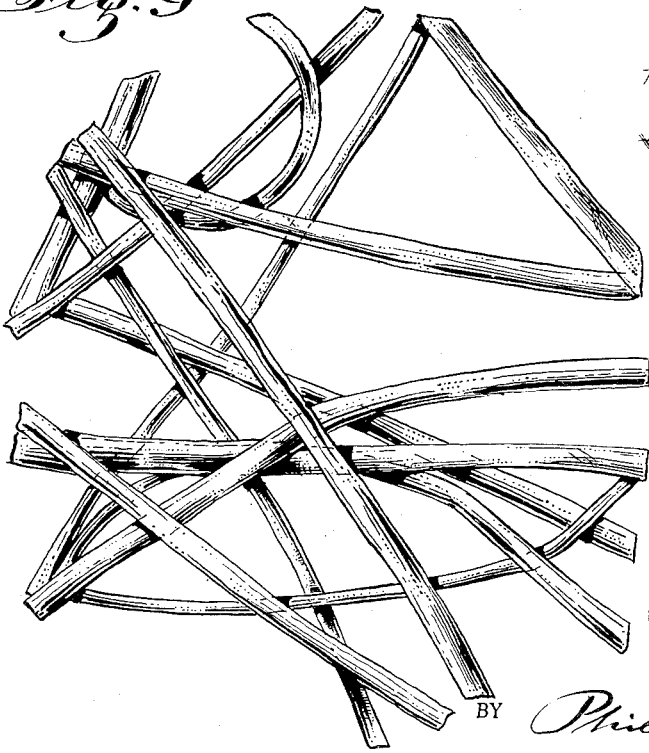
INVENTOR
Mario R. Pesce
BY Philip E. Liggers
ATTORNEY Patented Sept. 14, 1954

2,689,199

UNITED STATES PATENT OFFICE 2,689,199

NONWOVEN FABRICS

Mario R. Pesce, Philadelphia, Pa.

Application June 27, 1950, Serial No. 170,673

2 Claims. (Cl. 154—46)

(Granted under Title 35, U. S. Code (1952), sec. 266)

The invention described herein, if patented, may be manufactured by or for the Government for governmental purposes without the payment to me of any royalty thereon.

This invention relates to non-woven, porous, flexible fabrics prepared from masses of curled entangled filaments, and to methods of preparing the same.

In Patent No. 2,571,457, dated October 16, 1951, issued to R. K. Ladisch, a method and apparatus for preparing masses of curly filaments from melt-sprayed polymers and polymers in solution are disclosed, also curled entangled polymeric filaments containing finely divided metallic and non-metallic fillers. Self-sustaining or relatively rigid panels made from melt-sprayed polymers are claimed in abandoned application Ser. No. 138,872, filed Jan. 16, 1950, by R. G. H. Siu. Among the polymers and copolymers which in accordance with these methods may be melt-sprayed or sprayed from solutions to form filaments are: polystyrene, polydichlorostyrene, polyamides of the nylon type, polyacrylonitrile, polymethacrylonitrile, polymethyl methacrylate, polymethyl acrylate, polyvinylidene chloride, polyvinyl chloride, polyvinyl carbazole, polyvinyl alcohol, polymeric glycol terephthalate, cellulose acetate, cellulose propionate, cellulose acetate butyrate, cellulose nitrate, ethyl cellulose, polyethylene, halogenated polyethylenes, polybutene, polyisobutylene, polyvinyl butyral, polyvinyl acetate, and silicones. Also, mixtures of these polymers and copolymers may be spun.

The method of the above-identified patent is characterized by the conducting of the molten polymer, or polymeric solution, either with or without fillers, in a straight line which coincides with or is parallel to the axis of an imaginary cone which in turn substantially coincides with the whirling path taken by a gas (such as compressed air, steam, nitrogen, etc.) used to break up the polymer. The gas is forced through a nozzle whose inner conical walls cause the gas to travel at ever increasing velocity as it approaches the vertex of said cone until it attains supersonic velocity at said vertex (which is in mid-air just outside the nozzle) and there disrupts the polymeric stream and forms inherently curly polymeric filaments of varying lengths and of a diameter as small as 1 micron or as large as 274 microns and perhaps larger. The nozzle used in each case is substantially shown in the Ladisch Patent No. 2, 571, 457.

The invention provides thin, flexible, porous or non-porous sheets of continuously entwined and entangled masses of filaments which are prepared as disclosed in the above-mentioned patent. Among other uses, the following are contemplated:

(1) For disposable sheets, pillowcases, garments, capes, etc.
(2) For thermoinsulation
(3) For bacteriological and other filters.
(4) As a base for coated fabrics.
(5) As a fibrous filler and support for low temperature setting plastics.
(6) For ornamental mat structures, which may or may not be embossed, pigmented and/or printed.
(7) For the dielectric layers of condensers.

In the accompanying drawings,

Figures 2 and 3 are plan views of opposite faces of a sheet made in accordance with the invention;

Figure 4 is a sectional view through the sheet of Figures 2 and 3, on an enlarged scale;

Figure 5 is a perspective view on an enlarged scale of a modification showing two adhesively attached sheets partly separated;

Figure 6 is a plan view of a modification incorporating cellulose fibers in thin layers on the outer surfaces;

Figure 7 is a greatly enlarged cross section through the sheet of Figure 6;

Figure 8 is a plan view of a modification having both sides or faces of the sheet film-like, but the sheet itself being porous or of open texture.

Figure 9 is a reproduction of a photomicrograph (100 ×) of filaments which may be used to make fabrics embodying the invention.

Figure 1:
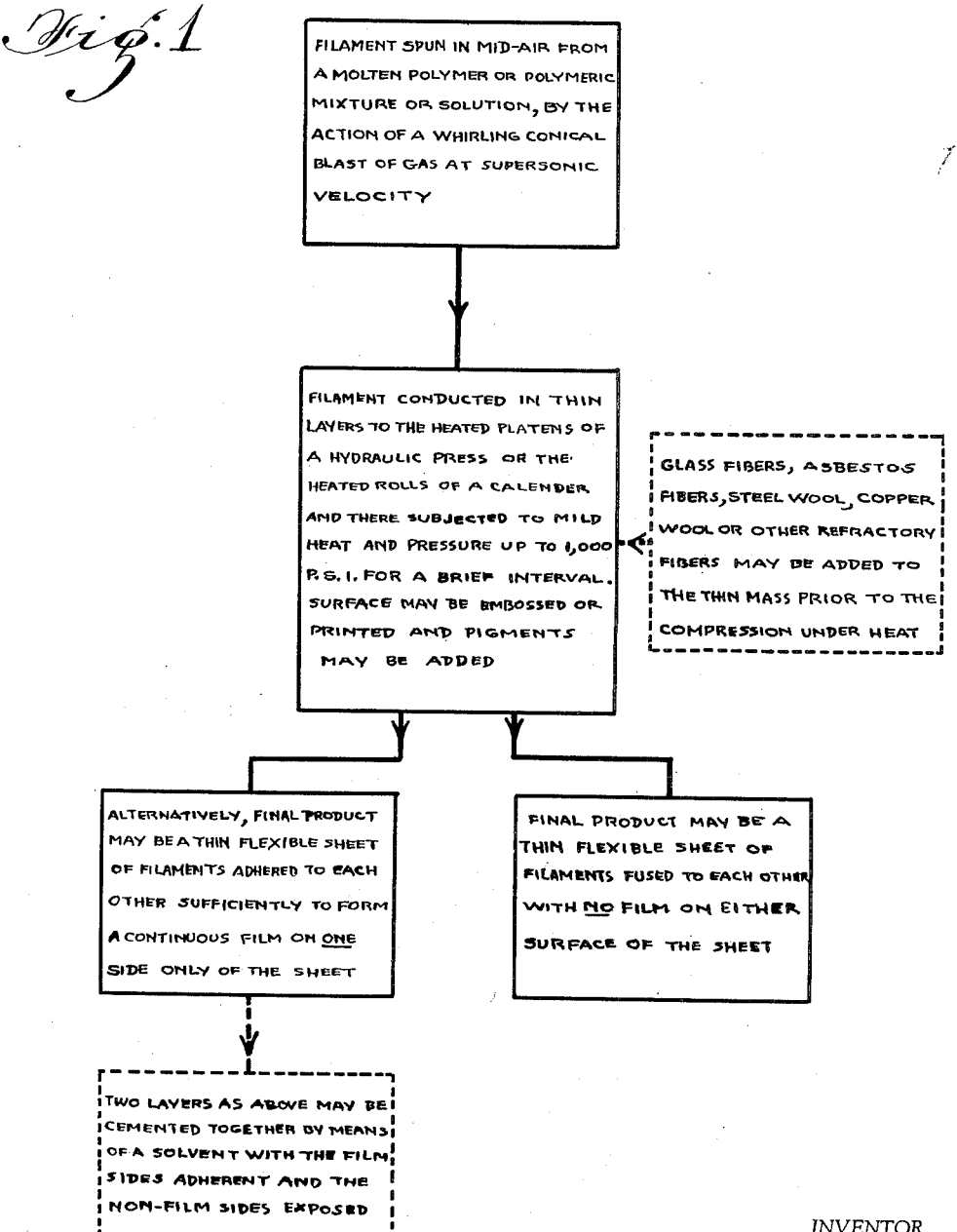
Figure 1 is a schematic diagram of the inventive method.

Referring first to Figure 9, some typical filaments made pursuant to the process of Ladisch Patent No. 2,571,457 are shown, these filaments being spun from a mixture of 80% cellulose propionate, 10% polystyrene and 10% plasticizer. The inherently curly nature of these filaments probably arises from the spiraling blast of gas which disrupts the molten polymer. Assuming that the filament has been spun by means of the nozzle described above from a molten polymer or copolymer or a solution thereof, with or without a filler, it is collected on a traveling belt or other support (not shown) and transferred, when of the proper mass or thickness, to a molding press. In the laboratory, a manually operated press was used (Preco Model) with electrically heated platens, thermometers inserted in the platen edges, and a gauge reading in total pounds pressure on the platens. Obviously, automatic presses or calenders would be employed in a commercial operation. The filamentous mass was placed between the two polished metal plates constituting the opposed faces of the platens and was preheated. Pressure was then applied and maintained for the indicated period, see Table I. After releasing the pressure, the compressed non-woven fabric was removed without cooling the press, which was accomplished without difficulty. In some instances, blotting paper or fabrics were placed over the platen faces, as the table shows.

Table I.—Molding data

| Sample No. | Type Filaments Used | Mold Surface | Pressure, p. s. i. | Time Under Pressure (seconds) | Molding Temp. (° F.) |
|---|---|---|---|---|---|
| 1 | Polystyrene | Metal | 500 | 5 | 220 |
| 2 | Cellulose propionate | do | 500 | 15 | 240 |
| 3 | do | Blotter | 500 | 20 | 250 |
| 4 | do | do | 1,000 | 12 | 250 |
| 5 | do | Fabric | 500 | 12 | 250 |
| 6 | do | Blotter [1] | 500 | 10 | 250 |
| 7 | do | Fabric [1] | 400 | 10 | 250 |
| 8 | Laminate-glass between cellulose propionate. | do | 1,000 | 10 | 250 |

[1] Material wet out in tap water. Water content approximately 100 percent based on original weight of dry material.

The physical characteristics of the fabrics so prepared are set forth in Table II, the samples being identified by the same numbers in both tables. It should be emphasized that only the samples illustrating some distinguishing characteristic or particular molding condition are listed in these two tables.

Table II.—Physicial characteristics of non-woven material

| Sample No. | Filament | Inventor's Remarks |
|---|---|---|
| 1 | polystyrene | Material has glazed surface and shows fairly strong adhesion between filaments at contact points. Material is also stiff, brittle and shows fused areas. |
| 2 | cellulose propionate. | Sample was appreciably less glazed and stiff than No. 1 and had good adhesion at filament contact points. |
| 3 | do | Sample was flexible, showed good texture, and good filament adhesion at contact points. |
| 4 | do | Similar to No 3, but some of the blotter fibers adhered to surface. |
| 5 | do | Considered the best sample of the group. Some of the desirable properties of this sample were good texture, embossed surfaces (due to fabric cover), flexibility and an adhesion strength at the filament contact points which exceeded the filament strength. |
| 6 | do | No apparent difference between this sample which was molded between wet blotting paper and the other samples prepared under similar conditions except with dry blotters. |
| 7 | do | Sample molded between wet fabric layers with no apparent difference than those molded between dry fabrics. |
| 8 | laminate | Laminate of glass filaments between cellulose propionate filaments shows good lamination and strength although rather stiff. |

Polystyrene filaments were molded at temperatures ranging from 220° to 250° F. under pressures of 500 p. s. i. to 1000 p. s. i. for periods of 5 to 15 seconds. Best results were obtained with the lower temperatures. Pressure and time differences were apparently not very important within the ranges tested. The products obtained were considered quite stiff and brittle, and hence unsuitable for use as disposable sheets, garments etc., though acceptable for some of the other contemplated uses listed above.

Cellulose propionate filaments were molded at temperature ranges of 200°–250° F. under pressures of 100–1000 p. s. i. for periods of 5–30 seconds. Best results were obtained at the higher temperatures and pressures with the molding period about 15 seconds. Thickness of the several sheets varied between 130 microns and 1250 microns. The color of the sheets varied from pale grey or "off-white" to pale brown. Apparently, higher temperatures darkened the sheets formed during the experiments due to a chemical change in the filaments.

It was found that imperforate films could be formed on either side or face of a non-woven sheet by merely applying greater heat to that side or face than to the other side, which resulted in a flexible sheet 10 (Figs. 2, 3 and 4) having a continuous glossy film 11 on one side and having a rough, open texture 12 on the other side. Obviously, the heat applied will vary with the polymer or copolymer, but generally speaking it would be within the range of Table I. In lieu of differential heat application, both platens may be heated to the same temperature and if this heat is sufficient, films will be formed on both sides or faces of the sheet, which will be porous or non-porous depending on the volume of the polymeric mass subjected to the pressure. Figure 8 shows a very thin sheet of polystyrene which is permeable or porous, yet has slick or glossy surfaces due to the coalescing of the filaments under heat (250° F.) and pressure (1000 p. s. i.) between metal platens for 10 seconds.

In a modification of the process, two thin sheets 15, 16 of polymeric filaments were prepared in accordance with the described method so that each had a film on one side, to provide a smooth glossy surface thereon. See Figure 5. Then the two sheets were secured together by applying an adhesive or solvent to the glossy film surfaces and pressing the sheets together. The adhesive used would depend on the nature of the polymer and could be either a cold cement or a heat-setting cement. This yielded a heavy composite sheet of a thickness of 2650 microns with fuzzy surfaces on both sides, and having a liquid-impermeable layer at the center.

Thin, laminated, non-woven sheets were produced by molding glass filaments between cellulose propionate filaments at molding temperatures of 255°–300° F. under pressures of 500–1000 p. s. i. for periods of 15–30 seconds. Best lamination was obtained at about 250° F. under 1000 p. s. i. for about 10 seconds. Good bonding was obtained between the layers. This laminated material was considerably stronger than the pure resin filament sheet but was also stiffer; obviously therefore, it would not be suitable for use as disposable garments or bed clothing but its superior strength would make it better in many cases as a fibrous filler and support for low temperature setting plastics and as a base for coated fabrics.

In further modifications of the process, the plates or platens were covered with woven cotten twill fabric, also later with paper blotter material, both of which were tested both wet (100% by weight moisture pickup) and dry. See Table I. The wet fabric and blotting paper provided the necessary moisture to plasticize the filaments under the temperature conditions of the press. These cover materials or molding surfaces cushioned the pressure and embossed the surfaces of the cellulose propionate fabrics, appreciably improving the texture of the fabrics and enhancing their appearance. Figures 6 and 7 show a porous and absorbent sheet with cellulose layers 20 of blotting paper adherent to a layer 21 of polymeric filaments partly fused. The cellulose layers 20 split off from the molding surfaces provided by the blotting paper on the platens. Embossing may also be effected by means of embossing rolls on a calender, as is well known and hence not illustrated. In lieu of or in addition to embossing, the surface provided by the film may be printed. Pigments, fillers or colorants may be incorporated in the laminated sheets or the embossed or printed sheets, or if preferred, the pigments may be finely divided fillers added to the polymeric melt or solution prior to the spinning as disclosed above, in which event the sheets may be given the desired appearance and color.

The non-woven fabrics produced consisted of a tangled, randomly oriented mass of curled filaments which adhered to each other at many contact points. If desired, complete fusion at the contact points may be achieved or the filaments can be merely deformed and mechanically bound at these points. It was possible to produce non-woven fabrics of cellulose propionate whose contact point strength compared favorably with filament strength. This was particularly true of sample No. 5, Table II, as noted above.

If desired, mixtures of two or more polymeric filaments may be subjected to heat and pressure as described above to form thin sheets having physical characteristics superior to those arising from the use of a single polymer. Many other changes and variations from the described procedures may be resorted to, within the scope of the appended claims.

What I claim is:

1. A thin, flexible sheet consisting of an inner thin lamination composed of unwoven glass fibers and outer laminations each consisting of curly, entangled, thermoplastic resinous filaments bonded to each other by heat and pressure, the volume of the glass fibers being less than that of the thermoplastic filaments, and all the laminations being adherent.

2. The invention defined in claim 1, wherein the resinous filaments are selected from the group consisting of polystyrene, polydichlorostyrene, polyamides, polyacrylonitrile, polymethacrylonitrile, polymethyl methacrylate, polymethyl acrylate, polyvinylidene chloride, polyvinyl chloride, polyvinyl carbazole, polyvinyl alcohol, polymeric glycol terephthalate, cellulose acetate, cellulose propionate, cellulose acetate butyrate, cellulose nitrate, ethyl cellulose, polyethylene, halogenated polyethylenes, polybutene, polyisobutylene, polyvinyl butyral, polyvinyl acetate, and silicones.

References Cited in the file of this patent

UNITED STATES PATENTS

| Number | Name | Date |
| --- | --- | --- |
| 2,459,803 | Francis | Jan. 25, 1949 |
| 2,476,282 | Castellan | July 19, 1949 |
| 2,476,283 | Castellan | July 19, 1949 |
| 2,483,404 | Francis | Oct. 4, 1949 |
| 2,483,405 | Francis | Oct. 4, 1949 |
| 2,538,899 | Dodge et al. | Jan. 23, 1951 |
| 2,543,101 | Francis | Feb. 27, 1951 |
| 2,544,797 | Lippmann | Mar. 13, 1951 |

FOREIGN PATENTS

| Number | Country | Date |
| --- | --- | --- |
| 621,950 | Great Britain | Apr. 25, 1949 |